July 11, 1939. A. H. BROWN, JR 2,165,694
ELECTRICAL CONTROL DEVICE
Filed March 19, 1937
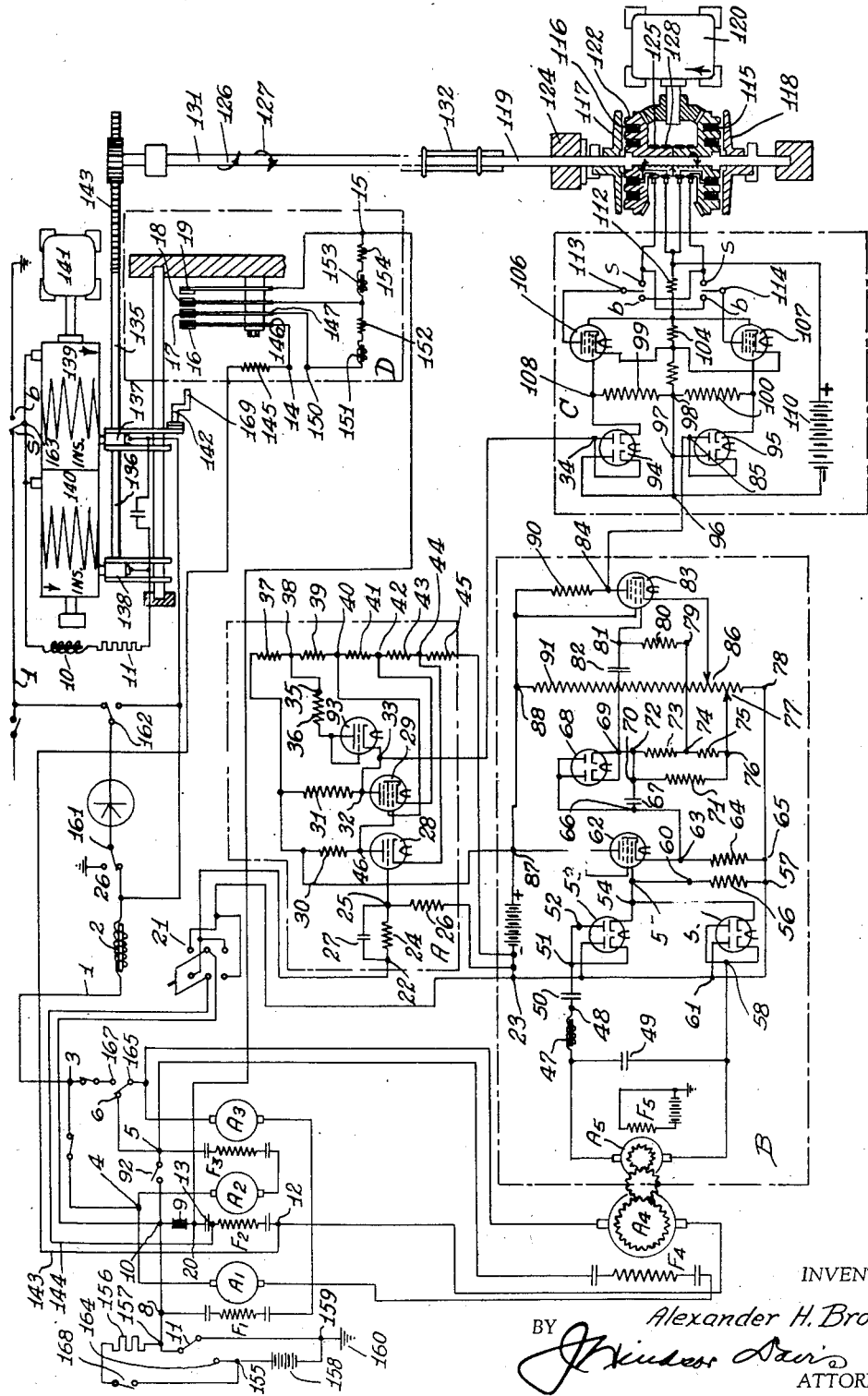
INVENTOR.
Alexander H. Brown Jr.
BY
ATTORNEY.

Patented July 11, 1939

2,165,694

UNITED STATES PATENT OFFICE 2,165,694

ELECTRICAL CONTROL DEVICE

Alexander H. Brown, Jr., Detroit, Mich., assignor to Transit Research Corporation, New York, N. Y., a corporation of New York Application March 19, 1937, Serial No. 131,835

9 Claims. (Cl. 172—179)

This invention relates to electric circuits to control a current producing mechanical motion in such manner that the control is a function of the actual mechanical motion itself, the desired mechanical motion and the current producing that mechanical motion.

It is a further object to provide means in this control for changing the relative influence of the actual mechanical motion itself, the desired mechanical motion and the current which is producing the motion as a function of either the current magnitude, the mechanical motion or the desired mechanical motion, or according to the first, second, third or fourth derivative with respect to time of the aforementioned factors, or according to any combination thereof.

A further object is to provide means for controlling the rate of change of the acceleration of an electric motor as a function of (1) the actual rate of change of the acceleration, (2) rate of change of rate of change of acceleration, (3) motor current, (4) rate of change of motor current and (5) desired rate of change of acceleration.

It is a further object to provide means for transferring the control automatically from dependence upon the above named factors to the following factors, said transfer being determined by the magnitude of the acceleration and the desired acceleration: (1) acceleration, (2) rate of change of acceleration, (3) motor current, (4) rate of change of motor current and (5) desired acceleration. By controlling the power flow to an electric rail car, for example, according to the foregoing objects, we initially obtain a control, upon starting, of the rate of change of acceleration of the car, and a means for preventing oscillation of the actual rate of change of the car acceleration, sometimes called hunting. Then when the car has reached the desired acceleration the control is automatically changed to maintain said rate of acceleration and to prevent hunting about this rate of acceleration. In other words, the increase of acceleration from zero to the desired acceleration is obtained with smoothness and when the desired acceleration is reached it is automatically maintained with smoothness and without danger of excessive current through the motors.

More particularly, it is an object to provide means for impressing upon a terminal a voltage which is a function of motor current, to provide means whereby an operator may designate the acceleration he desires by causing a voltage to be impressed upon a second terminal, and to provide further means for utilizing the differential between these two voltages to regulate the flow of current to the motors both as to smoothness and magnitude thus precluding equipment shocks and enhancing riding comfort.

Other objects and advantages either directly described or indirectly implied will become more fully apparent as reference is had to the accompanying drawing wherein my invention is diagrammatically illustrated and in which:

The single figure of the accompanying drawing is a diagrammatic illustration of my improved control means.

The control is illustrated in operative association with one of four electric motors A₁F₁, A₂F₂, A₃F₃, A₄F₄, which may be the driving motors of a street car, for example. These motors are connected to a source of electrical power 1 and the flow of current to the motors is subject to control by an inductive circuit including inductors 2 and 10, a resistance 11, contactors 161, 162, 163 and a commutator-like device 137, 138, 139, 140, 141. This inductive control circuit is fully described in my co-pending application now Patent Number 2,078,232 filed July 19, 1935. The present invention is a control for this inductive control.

In order to facilitate the explanation of the present invention, the circuit is broken up into several parts by the use of the dot and dash lines, four of these parts or sub-circuits being designated A, B, C and D.

The several switches are closed for use of these main motors as motors so that current flows from a terminal 26 through the line 1 to an inductor 2, terminal 3, and terminal 4 at which point it divides into substantially equal parts, one part flowing through the field coils F₄ of the fourth main motor, to a terminal 5, and the other part, starting at terminal 4, flows through another main motor armature A₂, field coils F₃ of the third motor and re-unites with the other part at terminal 5. The switch 92 is open. The total current then flows to a terminal 6, through the switch which is closed thereon to terminal 7 at which point it divides into substantially equal parts, one part flowing through a third main motor armature A₃ and field coils F₁ of the first motor, to a terminal 8, the other part flowing through the fourth main motor armature A₄ and field coils F₂ of the second motor, to a shunt 9, to a terminal 10, and to the terminal 8 where it re-unites with the other part and total current then flows through a switch which is closed on terminal 11 to a ground at 160. After full trolley line potential has been impressed on the terminal 3 the normal procedure is to shunt the motor field windings $F_1$, $F_2$, $F_3$, and $F_4$ as the car speeds up. A sample of the method of shunting these field windings is shown in the case of the winding $F_2$ where leads are connected to terminals 12 and 13 and proceed to terminals 14 and 15. The shunting is accomplished by the travel of the current control brush 137 to the right by closing contacts shown schematically at 16, 17, 18 and 19 (circuit D). The shunt circuit of each of the field windings is independent of the shunt circuits for the other windings and may be duplicates thereof. As current flows through the control shunt 9 the IR drop across this shunt is conducted from terminals 10 and 20 to the double pole double throw switch 21 thence to terminals 22 and 23. A small current is permitted to flow from terminal 22 through a resistor 24 to terminal 25 and through a resistor 26 back to terminal 23. When the IR drop across the shunt is changing, the voltage across the condenser 27 is changing and hence a current may be considered to be flowing through condenser 27 during this time and the voltage at terminal 25 is a function of both motor current and rate of change of motor current, the rate of change function resulting from the use of the condenser 27. The voltage existing at 25 is conveyed to the grid of a vacuum tube 28 which is commercially available as a "number 76" tube. The sections of the circuit inclosed by the dotted line A are used primarily to amplify the voltage drop across the shunt 9 and it is a further purpose of this group of circuits to produce an output voltage which has a component which is a function of the rate of change of voltage across the shunt 9. These circuits in section A also cause the rate of change of output voltage after amplification with respect to rate of change of voltage across the shunt 9 to increase greatly in magnitude when the voltage drop across the shunt 9 reaches a point corresponding to maximum rated motor current. The amplification is accomplished by the use of vacuum tubes 28 and 29 working in connection with resistors 30 and 31. The tube 29 is commercially known by the number 43. This amplifies both the voltage at terminal 25 which is due to voltage drop across shunt 9, and the voltage component at 25 which is due to the rate of change of voltage with respect to time across the shunt 9. The output voltage of this group of circuits is taken from the terminal 32 to terminal 33 and thence to terminal 34 for use in the circuit C as will be hereinafter described.

When the potential at 33, which is connected to the cathode of a tube 93, commercially available as type "76", is sufficiently high with respect to the plate potential of tube 93, no current flows through the tube 93. When no current is flowing through the tube 93 the plate potential is the same as that at the terminal 38. When the potential at terminal 33 is sufficiently low with respect to the potential at terminal 38 the tube 93 conducts current which flows to the terminal 33 where it joins the current from terminal 32 in flowing to the terminal 34. When tube 93 is conducting, a given change in the potential at terminal 46 produces a certain change in the potential at 33. When tube 93 is not conducting, the same amount of change in the potential at 46 will cause a very much greater change in the potential at 33 than in the previous case. This change at 33 is of the order of, say, sixty-five times as great when the tube 93 is not conducting as when the tube 93 is conducting. The reason for this is that a given change in the potential at 46 produces approximately the same change in current passing through tube 29 regardless of variation in potential at 32. It is seen that a given change in current through tube 29 will cause a change in the potential at 32 depending upon the proportion of this current through the tube 29 which passes through the fixed resistor 31. For example, if the change of current passing through the tube 29 be represented by I and 1% of I passes through the resistor 31 and 99% of I passes through the tube 93, the change in voltage across resistor 31 is .01 I times the resistance of 31 whereas, if tube 93 is non-conducting, the change in voltage drop across resistor 31 is I times the resistance of 31, which is seen to be 100 times as great. This explanation neglects the effect of changing the potential at 33 upon changed current flow from 33 to 34 because the current flow from 33 to 34 is small in comparison with the flow through the tube 29. However substantially the same result would follow even though current from 33 to 34 were not neglected.

In summary for the A circuit, the potential at 34 is a function of voltage drop across shunt 9, which drop is proportional to motor current, the potential at 34 being also a function of rate of change of motor current and for a given change of motor current the corresponding change in potential at 34 remains at a fixed relatively low ratio for motor currents at or below rated values. For motor currents exceeding rated values the tube 93 becomes non-conducting and a further given increase in motor current causes a much greater increase in the potential at 34.

Next consider the circuit B. The small direct current generator designated $A_5$ is driven by motor armature $A_4$ in such manner that the speed of $A_5$ is proportioned to the rotational speed of the car axles. The field strength thru the armature $A_5$ is maintained constant. This will give an output voltage of $A_5$ proportional to the rotational speed of the car axles. This output voltage will contain a small ripple which is filtered by means of a condenser 49 and an inductor 47 so that the potential at 48 is substantially unaffected by the ripple voltage of $A_5$ and may therefore be said to be proportional to angular axle speed. The condenser 50 is used in conjunction with resistor 56 to convert rate of change of potential at 48 to a potential at 51. The manner in which this is accomplished may be thought of as follows: As the potential at 48 rises with respect to the potential at terminal 58, plus charges accumulate on the plate of the condenser 50 adjacent terminal 48. The accumulation of these plus charges tends to repel plus charges from the opposite plate of the condenser 50 and these plus charges pass through the terminals 51 and 52 constituting a current which flows through the tube 53 by passing from the plate of tube 53 which is connected to terminal 52 into the corresponding cathode to 54, 55, 60, 56, 57, 61 to the plate of tube 59, to the corresponding cathode of tube 59 back to terminal 58 and thence back through the generator $A_5$. This current is a function of the rate of accumulation of plus charges on the condenser plate adjacent terminal 48. The rate of accumulation of these plus charges is a function of the rate of change of voltage produced by the generator $A_5$ which in turn is a function of the rate of change of speed of the car axles. Therefore the current through the resistor 56 is a function of the rate of change of speed of car axle, or in other words is proportionate to the acceleration of the car axles. Since the voltage difference between 55 and 57 is proportionate to current through the resistor 56 the potential at 55 is a function of the acceleration of the car axle.

Current is supplied from a suitable source connected at 89 to a tube 62, commercially known as type "43", the flow of which is controlled by the potential at 55 connected to the control grid thereof. Therefore the current through tube 62 is a function of car axle acceleration. Current through the tube 62 passes to terminal 63 at which point it may, under some conditions, divide, part of it passing through the resistor 64 and part of it proceeding through terminal 66 at which point it may divide again, part passing through the condenser 67 and part through the tube 68, commercially known as type 25—Z—5 to terminal 69. For the present let us consider that all current through the tube 62 passes through the resistor 64. Since this current is a function of car axle acceleration, potential at 63 is a function of car axle acceleration.

Next let us consider that no current is passing through the tube 68 but is permitted to pass from 63 to 66 and that car axle acceleration is increasing, current flow through the tube 62 is increasing and, hence, the potential at 63 is rising. The potential at terminal 66 is becoming more positive which produces a current through the condenser 67 in the same manner as increasing potential at 48 produces current through condenser 50. This current passing through the condenser 67 flows through terminal 70 where it divides and part passes through the resistor 71 and part to the terminal 72, thence through resistor 73, terminal 74, resistor 75 to terminal 76, where it reunites with the current through 71 and passes to movable terminal 77 and thence to return circuit at 78. This current passing through the terminal 70 is a function of rate of change of car axle acceleration. It is then evident that potential at 74 is a function, under these conditions, of the rate of change of car axle acceleration and hence potential at terminal 81 is a function of rate of change of car axle acceleration. Further, a rate of change of rate of change of voltage at 66 will produce a rate of change of voltage at 70 and hence at 69. This rate of change of potential at 69 causes a current to flow through the condenser 82 in the same manner as current was made to flow through the condenser 50 previously described. This current flow through the condenser 82 passes through 81, 80, 79, 74, 75, 76, 77 and to 78. This last mentioned current causes a potential component at 81, which is a function of the rate of change of voltage at 70, which in turn is a function of the rate of change of the rate of change of car axle acceleration. Hence, the actual potential at 81 is, under these conditions, partly made up of a potential due to rate of change of car axle acceleration and partly of a potential due to rate of change of rate of change of car axle acceleration. This potential at 81, is one of the factors which determines the current passing through tube 83 since it is connected to the control grid thereof and which in turn determines the potential at the terminal 84, since it causes the current to change through the resistor 99. Under these conditions, that is—where tube 68 is non-conducting, the potential at 84 has one component which is an inverse function of rate of change of car axle acceleration and another which is an inverse function of the rate of change of rate of change of car axle acceleration. The potential at 84 is the same as the potential at 85 (subcircuit C).

There is another factor used to control the current through the tube 83 which is very important. The potential of the cathode of tube 83 is variable by means of the manually movable terminal 86. The current through tube 83 is therefore a function of the position of terminal 86 on its resistor 91. If the terminal 86 is moved to raise the potential of the cathode of the tube 83, the effect is to reduce current through the tube 83 which causes an increase in the potential at 84 and hence at 85. This forms the other component of the potential at 85, which when added to the aforementioned component at 85 due to the potential at 81 produces a resultant potential at 85 as will be referred to hereinafter in connection with the description of circuit section C.

Assuming another condition which exists when the tube 68 is conducting, a rise in the potential at 66 is communicated directly to the tube 68 to cause a rise in the potential at terminal 69 thus substantially short-circuiting the condenser 67 and thereby causing the potential at 69 to be a function of car axle acceleration. This produces a potential at 74, which is a function of car axle acceleration and hence a potential component at 81, which is a function of car axle acceleration. In this case the action of condenser 82 is similar to the above described action of condenser 50 in that it produces a potential component at 81 which is a function of the rate of change at 69. Since the potential at 69 is a function of car axle acceleration, we see that the potential at 81 is a function of both car axle acceleration and rate of change of car axle acceleration. For instance, if the car axle acceleration should increase suddenly the potential at 81 would increase faster than it would normally do if it were dependent solely on car axle acceleration for instance by omitting the condenser 82. The effect of this is, in the light of previous descriptions, to reduce the potential at 85 more rapidly than would be the case were the control based solely on car axle acceleration and did not introduce a component which is a function of rate of change of car axle acceleration. The circumstances which determine whether or not the tube 68 is conducting or non-conducting are the potential at terminal 66 which potential is connected to the plates of tube 68, and the potential at terminal 69, which is connected to the cathodes of tube 68. The potential at 69 is, in addition to being a function of current thru condenser 67 amenable to control by hand by moving terminal 77 on resistor 91. For example if the terminal 77 be moved toward 88 the potential of the cathodes of tube 68 is raised and it is therefore necessary for the potential at 66 to rise higher in order for the plate potentials to exceed cathode potentials of tube 68 which is the condition necessary for the tube 68 to become conducting. It is therefore possible to determine by hand the car axle acceleration which must be reached (which determines the potential at 66) before tube 68 becomes conducting and at which instant the basic control is shifted from controlling rate of change of car axle acceleration to controlling car axle acceleration. More specifically, it is thus clear how, to take an example, the rate of change of acceleration of a street car may be maintained substantially constant until any desired accleration is reached whereupon that acceleration is automatically maintained.

In actual practice, again taking the example of a street car, the motorman wishing to start the car from rest would move terminal 86 to a position on resistor 91 which would produce a rate of change of acceleration corresponding to the position selected. The terminal 77 would coincidentally be moved by a mechanical linkage connecting it to terminal 86 to a position on resistor 91 such that after the acceleration had increased to the desired value tube 68 would become conducting and control would change over from rate of change of acceleration to acceleration. The value of acceleration thus maintained also depends upon the position of terminal 86. It is thus apparent that in the case of the circuit as shown there is a definite relation between the united rate of change of acceleration and the subsequent acceleration because the position of the terminal 86 controls both values, and this relation may be varied through a substantial range for instance by changing the size of the condenser 67 or by altering the mechanical linkage connecting terminals 86 and 77, or by altering the relative values of the resistors 71, 73 and 75.

We thus see that the motorman's control over terminal 86 provides a means for varying the current through the tube 83, and hence for varying the potential at terminal 84 and hence the potential at terminal 85.

Refer now to circuit C. The potential at terminal 85 is combined with the potential at terminal 34 by means which convert differences between these two potentials into mechanical motion of a shaft 119 in such a way that when terminal 34 is at a higher potential than terminal 85 the shaft 119 has a direction shown by the arrow 126 and when terminal 85 has a potential higher than 34 the shaft 119 has a direction of rotation shown by the arrow 127. A principal function of this circuit is also to insure no useless friction between the clutch discs 117 and 118 which operate the shaft 119 and their respective electro-magnetic gears 122 and 123 which operate the discs and the shaft 119. The potential of the negative terminal of battery 110 and hence of terminals 96, 97 and 98 is determined by the lower of the two potentials at either 34 or 85. For example, if the potential at 34 be lower than the potential at 85, the cathode of tube 34 tends to receive current from its corresponding plate and hence from terminal 96 whereas the higher potential at 85 has no means of flowing directly through the tube 95 to terminal 97 and hence to 96 because when the cathode connected to terminal 85 is at a higher potential than its corresponding plate potential, current can not flow. And vice versa, if terminal 85 be lower than terminal 34 the cathode of tube 95, which is connected to 85, receives current from the terminal 97 until the potential of the terminal 97 has fallen to substantially that at terminal 85. The tube 94, in this case, is ineffective to reduce the potential at the terminal 97 in the same way in which tube 95 was rendered ineffective in the preceding case. We thus see that the terminal 98 is always substantially at the lower of the two potentials 34 or 85. The action of the higher of the two potentials at either terminal 34 or 85 may be best explained by a specific case. For example, if the terminal 34 be at a higher potential than 85 no current passes through the cathode of tube 94 which is connected to the terminal 34. However, current does pass from the plate of the tube 94, connected to terminal 34, to its corresponding cathode which is connected to the terminal 108. This current passes through the resistor 99 to terminal 98 which produces a potential across the resistor 99 and drives the control grid potential of the tube 106 more positive with respect to its cathode which increases the conductivity of tube 106. The potential across the resistor 100 which simultaneously exists is very small, being practically negligible, which keeps the control grid of tube 107 sufficiently negative to prevent appreciable current flow. Thus when the potential at 34 is higher than at 85 the tube 106 is conductive and the tube 107 is non-conductive. Further, when tube 106 is in a conducting state it is seen that current flows from the positive terminal of battery 110 to terminal 112, thence to slip ring 128, to the coil 116 to slip ring 125 to terminal 113 from whence current flows through tube 106. Thus, current flows only through the coil 116 and not through the coil 115. In a similar manner, when terminal 85 is at a higher potential than 34 current flows only through the coil 115. When the coil 116 is energized the magnetically permeable disc 117 is pulled longitudinally along shaft 119 into contact with an electro-magnetic gear 112. The disc 117 is mounted on shaft 119 in such as way that it is free to move a limited distance longitudinally along said shaft but is not permitted to rotate relatively to said shaft. When the coil 116 is de-energized the disc 117 is not pulled into contact with gear 122. A motor 120 runs at substantially constant speed. The bevel pinion 121 is keyed to the motor shaft and is permanently in mesh with both gears 122 and 123 which causes these gears to rotate continuously in opposite direction since they are free to rotate on the shaft 119 but are not permitted to move longitudinally along said shaft. It follows that when the disc 117 is pulled into contact with gear 122 a torque is imparted to said disc which causes the shaft 119 to rotate in the same direction as gear 122, in the direction indicated by arrow 126. In a similar manner, when the coil 115 is energized it acts upon disc 118 to cause shaft 119 to rotate in a direction indicated by the arrow 127.

In summary, when the potential at the terminal 34 is higher than at terminal 85, the shaft 119 is caused to rotate in the direction of arrow 126. And, vice versa, when the potential at 85 is higher than at 34 the said shaft is caused to rotate in the direction of arrow 127. When the potential at 34 is just equal to the potential at 85 no appreciable current flows through either coil 115 or 116 and no appreciable torque is applied to shaft 119.

The shaft 119 is connected to the shaft 131 by a friction clutch 132. A pinion 133 is mounted rigidly on shaft 131 and is in mesh with a rack 134. Since the friction clutch is constantly engaged any rotation of the shaft 119 produces torque on shaft 131 which tends to move rack 134 and will move the rack 134 within the normal limits of its travel. When the normal limit of its travel is reached in either direction the friction clutch 132 will slip if the shaft 119 is still rotating. The rack is directly connected by means of rods 135 and 136 to brush assemblies 137 and 138. When the rack 134 has travelled to the left to its normal limit the brush 137 makes no contact with the conducting commutator element 139 and likewise the brush 138 makes no contact with the commutator conducting element 140. When the rack 134 has travelled to its extreme position to the right the brush 137 makes continuous contact with the element 139 and likewise brush 138 makes continuous contact with the element 140.

At intermediate positions of the rack 134 both brushes 137 and 138 make intermittent contact with their respective commutator conducting elements. It is thus seen that a higher potential at 34 than at 85 causes brushes 137 and 138 to move to the left causing decreasing time of contact with their conducting elements. This decreasing time of contact with the conducting elements tends to reduce the current and voltage applied to the motors when the motors are receiving power from the trolley line. Thus, a higher potential at terminal 34 than at terminal 85 tends to reduce current through the motors and vice versa a higher potential at 85 than at 34 tends to move the brushes 137 and 138 to the right and hence to increase the current to the motors. The type of commutator elements herein referred to and the control circuit for the motors from this point is more fully shown and described in my co-pending application previously referred to. It is seen in that application that the commutator elements 139 and 140 are mounted on co-axial cylinders which are driven by a motor 141 which rotates at substantially constant speed.

In order to maintain constant power input to an accelerating series motor for an appreciable time after full line voltage has been applied to the motor it is customary to weaken the field strength of the series motor. In the case under consideration the full line voltage is applied to the main driving motors as soon as the brush 137 has moved far enough to the right to make continuous contact with the commutator conducting element 139. It is therefore necessary to weaken the field after this has occurred. This is accomplished by moving the brush 137 an additional distance to the right whereupon the insulating bracket 142 moves against the finger 16 forcing it to deflect and make contact with contact finger 17, whereupon some of the current which was passing through the field $F_2$ is by-passed through leads 143 and 144 to a resistor 145, terminal 146, finger 16, finger 17, terminal 147, terminal 150, inductor 151, resistor 152, inductor 153, resistor 154 and terminal 15. If it is desired to maintain constant power input to the main motors for a somewhat longer time the insulating bracket 142 continues to move to the right until contact fingers 16, 17 and 18 are in mutual contact which reduces the resistance of the by-pass circuit for $F_2$ still further by cutting out the inductor 151 and 152. Still further movement of the insulating bracket 142 to the right will cause the short circuiting of the inductor 153 and resistance 154 at which time the resistance of the by-pass circuit for the field $F_2$ consists solely of the resistor 145. It will be understood that this diagram of field shunting circuits may be altered to suit any particular set of requirements. In this connection it is interesting to note that increasing potential at 85 caused by either a decrease of car acceleration or manual movement of terminal 86 causes the bracket 142 to move further to the right. After all of the desired field shunting has been accomplished the bracket 142 has moved to the limit of its normal motion to the right and should the motorman still call for the same acceleration it can not be obtained.

The constants in the circuits are so determined that a small current in either of coils 115 or 116 will cause a sufficiently strong pull on the corresponding discs to cause the shaft 119 to very quickly assume the same rotational velocity as the electro-magnetic gears. This will insure, provided the speed of gears is made sufficiently high, a very quick acting control.

To sum up the circuits to this point, the circuit B has for its function to render available an output voltage (from circuit B) which is a function of the acceleration desired by the motorman and to continuously modify this voltage according to the acceleration, rate of change of acceleration or rate of change of rate of change of acceleration which the car actually has.

Circuit A, briefly, is subject to shunt voltages of the main motor circuits and hence to voltage values proportionate to motor current. This circuit first amplifies this voltage and then renders the resultant values available to circuit C for comparison with the values of circuit B. The amplification is such that during normal running, the voltage values of circuits A and B will substantially balance. Either circuit A or circuit B may affect movement through electro-mechanical means of the main brushes so that as quickly as an unbalanced condition appears, as by a change or an indicated change in acceleration or by a change in the rate of change of the car body, one or the other of these circuits will then cause a movement of the brushes on the commutator, this movement of the brushes being of sufficient magnitude to restore a balanced condition between these circuits A and B. The circuit A is so arranged that upon the tendency of motor current to exceed its rated value, the proportion of control which it exercises with respect to circuit B rises rapidly so that it overcomes all tendencies of the circuit B to continue the increase of motor current.

Circuit C is a means for comparing the value of output voltages of circuits A and B and of translating these voltages into electro-mechanical movement for positioning the brushes. In order to affect the necessary electro-mechanical movement it is a prime function of this circuit to render available immediately and positively the difference between the output voltages of circuits A and B for positioning the brushes.

The shunt circuit D which is a main motor field shunt is operative to maintain the motor current constant during acceleration subsequent to placing full line voltage on the main motors in response to the positioning of the brushes by the circuits A, B and C and hence maintains this current substantially constant automatically.

Preparatory to the motorman's application of brakes the field coils $F_1$ $F_2$ $F_3$ and $F_4$ of the main driving motors are reversed: the switch 21 is thrown to reverse the connection of shunt 9 to terminals 22 and 23; the switches at terminals 161, 162 and 163 are thrown from $s$ to $b$, the switch 92 is closed and the switch at terminal 165 is thrown to terminal 167.

The switch at terminal 164 is thrown from terminal 11 to terminal 155, momentarily, so that battery 158 forces current to flow through all four main motors in parallel. As soon as this current has reached a certain value the motors act as series generators and produce a cumulative increase in this current. When this current has reached a value determined by the characteristics of battery 158 the switch connected to 164 is thrown to terminal 11. The current flow through the motors is not interrupted during the switching at terminal 164 because the resistor 156, as well as the arc which may be drawn at 155, will carry this current during the short time which elapses before the switch is closed on terminal 11. After this time the main motor current flows from ground to terminal 159, 11, 164, 157, etc. to the motors. Subsequently in order to prevent the battery 158 from discharging through the resistor 156, switch 168 is open. During this time, the voltage conducted from terminal 26 to terminal 3 is sufficiently low to permit a rapid build up of current due to the generator action of the main driving motors. As this current increases the voltage output of circuit A increases the potential at terminal 34 and this potential is compared to the potential at 85 which latter potential is determined by the rate of deceleration which exists and by the rate of deceleration called for by the manual positioning of the terminal 86. As the potential at 34 rises it has a tendency to increase the current through tube 106 which in the case of braking as in starting tends to increase the current through the coil 116. This tends to move the brushes 137 and 138 to the left.

Coincidentally the potential at 85, which at first is determined largely by the positioning of terminal 86, tends to increase the current through the tube 107 and hence the current through coil 115, which tends to move the brushes 137 and 138 to the right. As the deceleration increases due to the rising current generated by the main motors, the potential at terminal 84 and hence at 85 tends to drop and the potential at 34 tends to increase and since initially at the beginning of braking the potential at 85 was the higher the potential at 85 will drop coincidentally as the potential at 34 rises until they are substantially balanced at which time the position of the brushes will be such as to permit the current through the motors required to produce substantially the braking deceleration called for by the manual positioning of terminal 86. It might be worth while noting that the potential at 81 rises as either deceleration or acceleration increases due to the action of tubes 53 and 59 in causing an increase of grid potential on tube 62 for either increasing or decreasing voltage of generator A5.

In the case of braking a movement of brushes 137 and 138 to the left causes an increase of the average potential available at 3 to oppose the generated voltage of the main motors and coincidentally produces field shunting which reduces the generated voltage of the main motors. If this potential at 3 be higher than the generated voltage the current through the motors will decrease and if lower the current will increase.

Since the braking deceleration is a function of motor current the normal condition for a constant braking deceleration is for the potential at terminal 3, due to conditions at inductor 2, to be substantially equal to the motor generated voltage.

Let us assume a more specific case where the braking deceleration rate has reached a substantially constant value and the car starts down hill.

The first effect is for the braking deceleration to decrease thus reducing the potential at terminal 81 which increases potential at 84 and 85 which in turn energizes coil 115. This will actuate the brushes 137 and 138 to the right, which reduces the potential at terminal 3 opposing motor generated voltage and tends to decrease field shunting. This encourages an increase of motor current which increases the braking torque to automatically counteract the effect of the hill and thus increase the decelerating rate back to substantially the original rate called for by the manual positioning of terminal 86. An exception to this substantially complete automatic compensation for the hill would be where the hill would be steep enough to require more than rated motor current to produce the increment of braking torque required in which case the potential at 34 would rise rapidly after full rated motor current was reached to operate coil 116 to move brushes 137 and 138 to the left which would rapidly increase the potential at terminal 3 opposing motor generated voltage and increase field shunting which tends to decrease motor generated voltage. Some means such as a mechanical extension 169 is added to the insulating bracket 142 during braking in order to secure full field shunting before brush 137 moves far enough to the left to make contact with the conducting element 140 (which contact is prevented by a stop 170 to limit brush travel to the left) and thus tend to prevent any further increase in motor current with the result that the loss of deceleration occasioned by the hill would not be compensated for to a full degree.

It might be helpful to consider the case also where the braking rate has reached a substantially constant value when the car is on a level track and the car starts climbing a hill. The first effect is to increase the decelerating rate and thus to increase the potential at terminal 81 and reduce the potential at 85 below that at terminal 34, which causes tube 106 to become conducting and to energize coil 116 which moves brushes 137 and 138 to the left. This increases the potential at terminal 3 opposing motor generated voltage, reducing motor current to compensate for the hill, and thus maintains the braking rate substantially constant automatically.

In the case where braking is called for at high speed the motor generated voltage will tend to be high. Since it is essential that the motor generated voltage never exceed the trolley line voltage which is the maximum available voltage which can be utilized as the opposing potential at 3 (otherwise motor current would increase rapidly out of control) it is necessary to always prevent this motor generated voltage from exceeding trolley line voltage.

In summary, the braking torque and hence the braking deceleration is controlled by opposing a controllable voltage to the motor generated voltage, the said opposing voltage being controlled by car deceleration, manual positioning of terminal 86 and motor current in a generally similar manner to the fashion in which these three factors were used to control acceleration. The chief difference is that in the case of deceleration the main motor field shunting takes place just before the brush 137 moves to the left limit of its travel, whereas in acceleration the main motor field shunting does not begin until after the brush 137 is moved far enough to the right to make continuous contact with conducting element -39.

The conditions being similar for negative acceleration during braking and for positive acceleration while increasing speed, the use of the term "acceleration" in the claims will be recognized as appropriately applying to both, unless otherwise limited by the context of an individual claim. Furthermore, while the examples taken relate to controlling the speed of a street car, many other examples might have been given. The motors of the car may be considered broadly as a car accessory and it will then become apparent that other types of accessories as, for instance, vehicle track brakes could be likewise controlled.

What I claim is:

1. In combination, a direct current electric motor subject to varying loads, a device for regulating the periods of connection and disconnection of said motor to an electric power line, and means subject to a function of said varying loads for altering the periods of connection and disconnection by said device whereby the acceleration of said motor is substantially maintained at a given value.

2. In combination in a vehicle having axles, a direct current electric motor for driving one of said axles, a device for regulating the periods of connection and disconnection of said motor to an electric power line, manual means adjustable to predetermine a desired vehicle acceleration, and means responsive to said manual means, to the current through said motor, and to a derivative of car axle speed for regulating the periods of connection and disconnection designated by said device.

3. In combination in a vehicle having axles, a direct current electric motor for said axles, an electric circuit subject to an input voltage proportional to the speed of rotation of said axles, means in said circuit for differentiating said voltage whereby the output voltage varies with a derivative of the speed of said axles, a second electric circuit subject to an input voltage proportional to the current of said motor, and means responsive to both of said circuits for regulating the current flow to said motor.

4. In combination in a vehicle having axles, a direct current electric motor for said axles, a device for intermittently connecting and disconnecting said motor to an electric power line, an electric circuit subject to an input voltage proportional to the speed of rotation of said axles, means in said circuit for differentiating said voltage whereby the output voltage thereof has a value proportional to the value of a derivative of the speed of said axles, a second electric circuit subject to an input voltage proportional to the current of said motor, and means responsive to the combined voltages of said circuits for regulating the periods of connection and disconnection called for by said device.

5. In combination in a vehicle having axles, a direct current electric motor for said axles, an electric circuit subject to an input voltage proportional to the rotational speed of said axles, means in said circuit for differentiating said voltage whereby the output is a derivative of the speed of said axles, a second circuit subject to an input voltage proportionate to the current through said motor, means in said second circuit for the amplification of said voltage to amounts which may equal the output voltages of said first circuit, a third circuit for comparing the output voltages of said first and second circuits, and means responsive to said third circuit for controlling the current flow to said motor.

6. In combination in a vehicle having axles, a direct current electric motor for said axles, an electric circuit subject to an input voltage proportional to the rotational speed of said axles, means in said circuit for differentiating said voltage several times, means for combining said derivatives whereby the output voltage is a derivative of the speed of said axles and of a combination of said derivatives, a second electric circuit subject to an input voltage proportionate to the current flow through said motor, means in said second circuit to amplify the voltage thereof to amounts approaching the output voltage of the first circuit, a third circuit for comparing the voltages of said first and second circuits, and means for translating the difference between said voltages into a means for controlling the current flow to said motor.

7. In combination in a vehicle having axles, a direct current electric motor for driving one of said axles, an electric circuit subject to an input voltage which is a function of the speed of said axles, means in said circuit for differentiating said voltage with respect to time and for selectively combining said derivative voltages, a manual operative means for modifying the output voltage of said circuit, a second circuit subject to a voltage which is a function of the current through said motors, and means for controlling the current flow to said motor according to the value of the combined voltages of said first and second circuits.

8. In combination in a vehicle having axles, a direct current motor for driving one of the axles, an electrical circuit subject to an input voltage which is a function of the speed of rotation of said axles, means for suppressing the ripple in said circuit, means for differentiating said voltage a plurality of times, selective means for combining the derivative voltages whereby the output voltage may be a function of or a derivative of or a derivative of a derivative of the speed of said axles, a manually operative means in said circuit for modifying said output voltage, a second circuit producing an output voltage which is a function of the current through said motor, electrical means for comparing the output voltages of said circuits, and means responsive to the difference between said voltages for controlling the flow of current to said motor.

9. In combination in a vehicle having axles, a motor for driving at least one of said axles, a control circuit subject to an input voltage which is a function of the acceleration of said axles, means for differentiating said voltage, a manual control for modifying the resultant voltage, a second control circuit subject to a voltage which is a function of the current through said motor, means for amplifying said last named voltage to values substantially equal to the output voltages of said first circuit, means for affecting a multiplication of the output voltages of said second circuit with the tendency to exceed the rated value of the current through said motor, a third circuit for comparing the output values of said first and second circuit, and means responsive to said third circuit for controlling the flow of current to said motor.

ALEXANDER H. BROWN, Jr.